June 13, 1939.　　　G. PITTMAN　　　2,162,315
HYDRAULIC TRANSMISSION
Filed Dec. 7, 1937　　　2 Sheets-Sheet 1
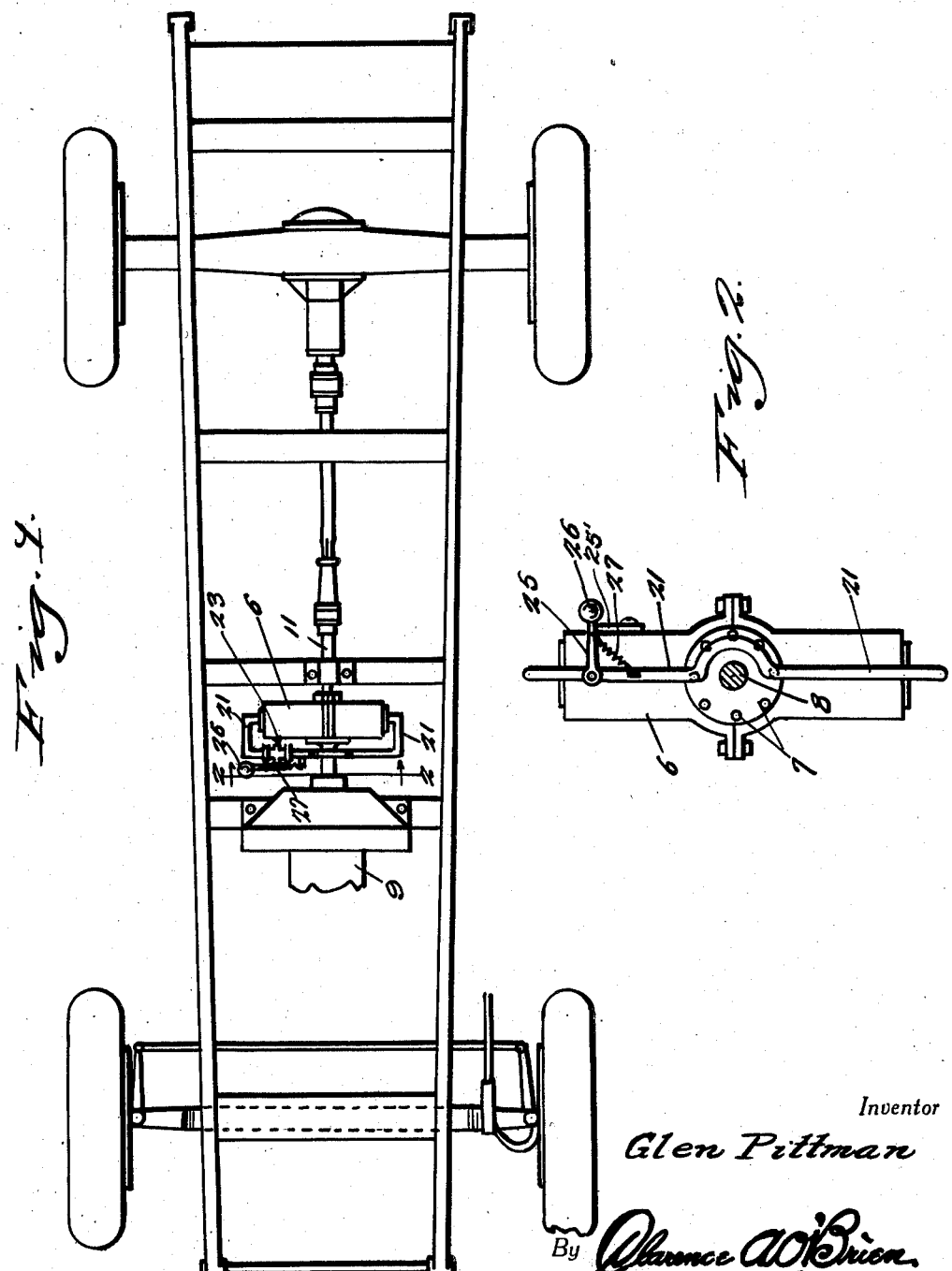
Inventor
Glen Pittman
By Clarence A. O'Brien
Hyman Berman
Attorneys June 13, 1939.  G. PITTMAN  2,162,315
HYDRAULIC TRANSMISSION
Filed Dec. 7, 1937  2 Sheets-Sheet 2
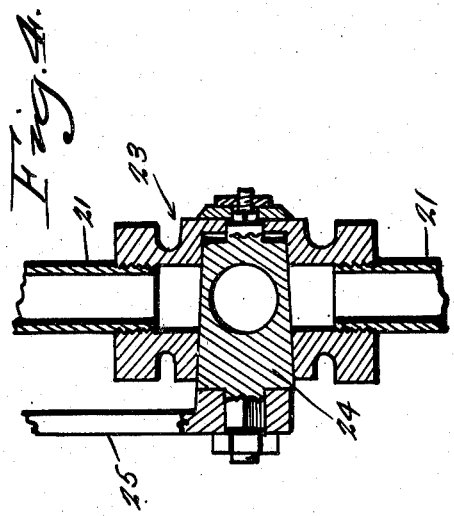
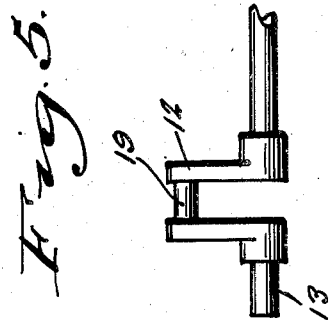
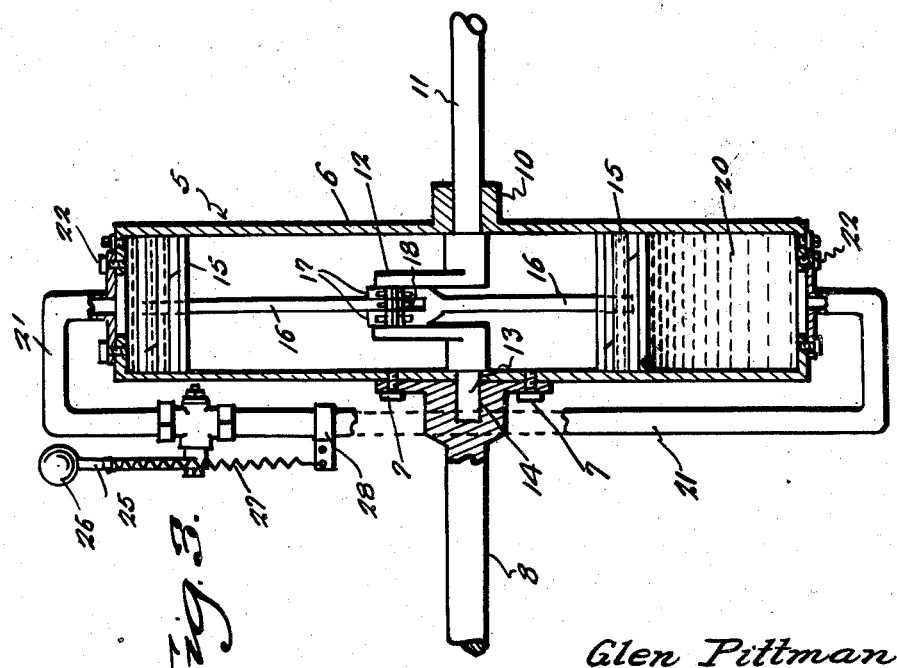
Inventor
Glen Pittman
By Clarence A. O'Brien
Hyman Berman
Attorneys Patented June 13, 1939

2,162,315

UNITED STATES PATENT OFFICE 2,162,315

HYDRAULIC TRANSMISSION

Glen Pittman, Wayne, Mich.

Application December 7, 1937, Serial No. 178,573

1 Claim. (Cl. 192—60)

This invention relates broadly to hydraulic transmission mechanisms and the object of the present invention is to provide a mechanism of this character especially designed for use in conjunction with automobiles for controlling the transmission of drive from the motor shaft to the propeller shaft of the automobile; and to provide a transmission which will operate in response to the speed of the motor shaft.

The invention together with its objects and advantages will be best understood from a study of the following description taken in connection with the accompanying drawings wherein:—

Figure 1 is a top plan view illustrating the application of the invention,

Figure 2 is a sectional view taken substantially on the line 2—2 of Figure 1,

Figure 3 is a sectional view through the transmission with certain parts shown in elevation, Figure 4 is a fragmentary detail view through the valve assembly forming part of the transmission mechanism, and Figure 5 is an elevational view of a crank member forming part of the invention.

Referring to the drawings by reference numerals it will be seen that the transmission device indicated generally by the reference numeral 5 comprises a cylinder 6 which is mounted as at 7 on one end of the drive shaft 8 of the internal combustion engine 9. At the side thereof opposite the connection 7 the cylinder 6 is provided with a bearing 10 in which is journaled one end of the driven shaft 11, which latter, in the present instance is illustrated as being the propeller shaft of an automobile.

Arranged within the cylinder 6 is a crank 12 one arm of which is suitably secured to the shaft 11 and the other arm of which is suitably secured to a shaft section 13 that is journaled in a bearing socket 14 and provided therefor in the end of the shaft 8 secured to the cylinder 6.

Operating reciprocably within the opposite end portions of the cylinder 6 are oppositely acting pistons 15 to which are pivotally connected one end of connecting rods 16.

One of the connecting rods 16 at the free end thereof is provided with a pair of bearings 17 while the other of the rods 16 at one end thereof is provided with a bearing 18 accommodated between the bearings 17 and, through the medium of the bearings 17 and 18 the rods 16 are connected to the bearing section 19 of the crank 12.

Fluid 20 is transferred from one end of the cylinder 6 to the other end thereof through the medium of a conduit 21 which at its respective opposite ends is suitably connected to the ends of the cylinder 6 as at 22. Arranged in the conduit 21 is a valve 23 and the core 24 of the valve is provided with a crank arm 25 provided with a weight 26.

Connected with the arm 25 is one end of a coil spring 27 which at its other end is suitably engaged with a clamp 28 provided on the conduit 21 and spring 27 acts on the arm 25 to normally urge the same to rotate in one direction for yieldably urging the valve core 24 to open position. Any suitable means may be provided for causing the spring 27 to normally hold the valve in open position such as the stop 25' shown in Figure 2.

The utility, advantages and operation of the transmission will be apparent from the following:—

As the speed of the engine shaft 8 increases arm 25 in response to centrifugal force and against the action of spring 27 swings in a direction tending to cause the valve core 24 to move to a closed position. As the valve core 24 slowly moves to a closed position the flow of fluid through the conduit 21 is retarded so that the pressure on the piston 15 increases to the end that a drive connection between shafts 8 and 11 is effected for transmitting drive from the engine shaft to the propeller shaft. When the engine reaches the R. P. M. which is its maximum efficiency valve core 24 will be in a completely closed condition so that the flow of the fluid from one end to the other of the cylinder is completely checked and the pistons 15 thereby retained against reciprocatory movement within the cylinder with the result that shaft 11 will then rotate at the same speed as shaft 8.

Obviously as the speed of the shaft 8 decreases valve 24 will slowly move to an open position so that the pressure on the pistons gradually decreases until the valve 24 is in complete open condition at which time there will be no transmission of drive from shaft 8 to shaft 11.

It is thought that a clear understanding of the construction operation and advantages of a hydraulic transmission embodying the features of the present invention will be had without a more detailed description.

Having thus described the invention what is claimed as new is:—

A hydraulic transmission device for connecting a drive shaft to a driven shaft comprising a transversely arranged cylinder having the central portion on one side thereof connected with the drive shaft and a bearing on the opposite side of the cylinder and located opposite the point of connection of the cylinder with the drive shaft, said driven shaft passing through the bearing, a crank member in the cylinder having one end connected with the driven shaft, means for rotatably supporting the other end of the crank member in the end of the drive shaft which is connected with the cylinder, a pair of pistons in the cylinder, connecting rods connecting the pistons with the crank of the crank member, a pipe line having its ends connected with and in communication with the ends of the cylinder, a valve casing located in the line, a rotary core in the casing and having an arm extending at right angles therefrom, a weight on the end of the arm and acting under centrifugal force to move the core to close position and spring means for normally holding the core in open position.

GLEN PITTMAN.